United States Patent
Rao et al.

(10) Patent No.: US 6,608,223 B2
(45) Date of Patent: Aug. 19, 2003

(54) CHOLESTEROL LOWERING STRUCTURED LIPIDS CONTAINING OMEGA 3 POLYUNSATURATED FATTY ACIDS AND THEIR PROCESS THEREOF

(75) Inventors: Reena Rao, Mysore (IN); Kari Sambaiah, Mysore (IN); Belur Ramaswamy Lokesh, Mysore (IN)

(73) Assignee: Council of Scientific and Industrial Research, New Delhi, IN (US)

( * ) Notice: Subject to any disclaimer, the term of this patent is extended or adjusted under 35 U.S.C. 154(b) by 121 days.

(21) Appl. No.: 10/014,247

(22) Filed: Oct. 22, 2001

(65) Prior Publication Data

US 2003/0078298 A1 Apr. 24, 2003

(51) Int. Cl.[7] .................................................. C11C 1/00
(52) U.S. Cl. ........................ 554/169; 435/134; 554/227; 514/558; 514/547
(58) Field of Search ................................ 554/169, 227; 514/558, 547; 435/134

(56) References Cited

PUBLICATIONS

Jen.en et al., "Lymphatic absorption of enterally fed strucutred triacylglycerol vs physical mix in a canine model," *Am J Clin Nutr*, 60:518–524 (1994).

Ghafoorunissa, "Requirements of dietary fats to meet nutritional needs & prevent the risk of atherosclerosis—An Indian perspective," *Indian J Med Res*, 108:191–202 (Nov. 1998).

Ghafoorunissa, "Fats in Indian diets and their nutritional and health implications," *Lipids*. 11:Supplement 2 (1996).

Ghafoorunissa, "Dietary lipids and heart disease—the Indian context," *National Medical Journal of India*, 7:5 (1994).

Ghafoorunissa, "n–3 fatty acids in Indian diets—comparison of the effects of precursors (alpha–linolenic acid) vs products (long chain n–3 polyunsaturated fatty acids)," *Nutrition Research*, 12:569–582 (1992).

Ghafoorunissa, "Ensuring quality of fats in Indian diets," *malaysian Oil Science and TechnologyJournal*. 4:1 (1994).

*Primary Examiner*—Deborah D. Carr
(74) *Attorney, Agent, or Firm*—Merchant & Gould P.C.

(57) ABSTRACT

Unique structured lipids obtained from interestifying coconut oil with free fatty acids obtained from hydrolysis of triglycerides of an animal source, said structured lipids rich in omega-3-poly unsaturated fatty acid and medium chain fatty acid and a process for the production of said structured lipids.

19 Claims, 2 Drawing Sheets

SYNTHESIS OF STRUCTURED LIPIDS

CO- Coconut oil

CO: CLO – coconut oil: Cod Liver oil blended at 1:1 molar ratio

SL omega 3- Structured lipids enriched in omega 3 PUFA

CHOLESTEROL LOWERING STRUCTURED LIPIDS CONTAINING OMEGA 3 POLYUNSATURATED FATTY ACIDS AND THEIR PROCESS THEREOF

FIELD OF INVENTION

The present invention relates to cholesterol lowering structured lipids containing omega 3 polyunsaturated fatty acids and a process thereof.

BACKGROUND AND PRIOR ART REFERENCES

Coconut oil is a kernel oil which is a natural source of medium chain fatty acids (MCFA) (53% of C8:0–C12:0). Its lauric acid content is very high (48%). The lauric fats provide high nutritional value because of their unique position in intercellular transport mechanisms; that is, either the portal or lymphatic systems can absorb them. They provide excellent nutrition for critically ill patients and do not cause any undue coronary difficulties despite their saturation. In fact, the lauric fats provide unexpected usefulness in protein catabolism, yielding positive nitrogen balance and enhanced protein formation. But coconut oil does not contain any omega 3 polyunsaturated fatty acids (PUFA). In addition to this, myristic and palmitic acids that contribute to around 33% of the total fatty acids of coconut oil have been shown to be hypercholesterolemic which is a risk factor for cardiovascular disease.

Medium chain fatty acids comprise fatty acids with 6 to 12 carbon chain lengths. MCFA offer numerous health benefits. They are easily absorbed, transported via the portal system and rapidly metabolized to yield quick energy and is not deposited in the body as fat. Medium chain triglycerides (MCT) have clinical applications in the treatment of fat malabsorption disorders, gall bladder disease, hyperlipidemia, obesity and deficiency of the carnitine system. But MCT alone cannot function as an ideal fat source for humans as they do not provide PUFA.

Omega 3 PUFA like eicosapentaenoic acid (EPA) and docosahexaenoic acid (DHA) have beneficial effects in controlling cardiovascular diseases, immune disorders, inflammation, renal disorders, allergies, diabetes and cancer. These fatty acids are also essential for the development of the brain and retina in humans. Eskimos in Greenland have lower serum cholesterol and triacylglycerol levels and lower incidence of cardiovascular disease owing to the relatively high intake of EPA from their diet. Studies with non-human primates and human new borns suggest that DHA is essential for the normal functioning of the retina and brain, particularly in premature infants. Other studies have shown that n-3 fatty acids can decrease the number and size of tumors and increase the time elapsed before the appearance of tumors.

Metabolically, EPA is an antagonist of the arachidonic acid cascade and competes with arachidonic acid as substrates for cyclooxygenase and lipoxygenase to produce eicosanoids. EPA is used for the synthesis of eicosanoids such as series-3 prostaglandins that ameliorate immunodysfunction. Arachidonic acid forms the series-2 prostaglandins that may impair the immune function. Diets containing high levels of n-6 fatty acids may increase the production of PGE2, decrease IL2 production, alter T cell response to IL2, inhibit macrophage collagenase synthesis, and enhance platelet aggregation. Feeding high levels of omega 3 PUFA will lead to substitution of some arachidonic acid by EPA and DHA. The PGE3 formed from EPA has less inflammatory effect than PGE2. IL 1 production is also lowered by omega 3 PUFA while IL 2 is increased. These changes in eicosanoid synthesis seen with omega 3 PUFA feeding are associated with an improved immunocompetence and a reduced inflammatory response to injury. Patients in need of elemental diets will benefit from having their immunocompetence improved.

Structured lipids are triacylglycerols containing mixtures of short-, medium-, and long-chain fatty acids attached to a glycerol backbone for specific functionality. Structured lipids are formed by the following methods

| | |
|---|---|
| (a) | hydrolysis and esterification |
| (b) | interesterification |
| (c) | lipase-interesterification |
| (d) | traditional chemical methods |
| (e) | genetic manipulation. |

They are particularly useful because of the way in which they are metabolized. Specific fatty acids can be attached to specific portions of the glycerol backbone to ensure that these fatty acids are absorbed in a specific manner in the digestive process. The process described here finds application in the synthesis of structured lipids designed to impart nutritional and physical benefits.

Cod liver oil is a natural source of EPA (13%) and DHA (8%). A physical blend of MCFA rich triacylglycerols and PUFA rich triacylglycerols does not improve the absorption or metabolism of the fatty acids since each of the individual triacylglycerol maintains its original absorption rates.

Omega 3 PUFA, especially EPA and DHA are generally not found in vegetable oils but can be an acceptable media for providing EPA and DHA from marine sources in the diet. Incorporation of EPA and DHA from fish oil into coconut oil would provide unique specialty oil, eliminate the need for physical mixtures and serve as a single rich source of both omega 3 PUFA and MCFA. One way to achieve this is through lipase-catalyzed reactions. In addition to providing benefits to the immune system, the structured lipid increases the absorption and transport of PUFA by putting both the marine oil and the medium chain triglyceride oil on the same glycerol backbone. Particularly, the structured lipid increases the absorption of eicosapentaenoic acid (EPA, C20:5 omega 3) and docosahexaenoic acid (DHA, C22:6 omega 3). The inclusion of medium and long chain fatty acids on the same glycerol backbone is thought to increase the water solubility of the fatty acids, increase the body's ability to digest the fatty acids, and increase the concentration of fat in the chylomicrons. Thus, the structured lipid aids in absorption, delivery and transport of the fatty acids.

Because of faster absorption, MCT's are useful as a calorie source in the treatment of hospitalized patients. Some hospitalized patients, particularly critically ill patients, have a high risk of infection and require total parenteral nutrition. These patients often have difficulty in obtaining the proper amount of nutrients and energy from the diet; a diet that both minimizes the risk of infection and provides quick nutrition would be of vast benefit to these patients. The changes in eicosanoid synthesis seen with omega 3 PUFA feeding are associated with an improved immunocompetence and a reduced inflammatory response to injury. Patients in need of elemental diets will benefit from having their immunocompetence improved by these structured lipids.

Reference may be made to the article by Lee, K. T and Akoh, C. C., (1996). J. Am. Oil Chem. Soc. 73, 611–615 where, structured lipids were synthesized by interesterification reaction between medium chain triglycerides and EPA ethyl esters. The drawback in this case, is the use of synthetic trilaurin, tricaprin and EPA ethyl esters were used. The effect of these structured lipids on the lipid profile of the body or other physiological effects were also not studied.

U.S. Pat. No. 4,871,768 discloses a synthetic triglyceride comprising a glycerol backbone having three fatty acids attached thereto, said fatty acids being selected from a first group consisting of omega-3 fatty acids, and a second group consisting of caprylic acid, capric acid and mixtures thereof. This patent also discloses a method for minimizing the effects of infection and minimizing the effects of subsequent infection by administering a diet containing 10 to 80% by weight of an oily fraction, said oily fraction being the aforementioned fatty acid. The major drawback in this case too is the use of synthetic trilaurin, tricaprin and EPA ethyl esters. In this case the process for the synthesis is not clear and the synthetic fatty acids used keeps the process at a disadvantage. The lipidemic effects of the product are also not stated.

Reference may also be made to the article by Akoh C. C. Jennings B. H and. Lillard. D. A, (1996) J. Am. Oil Chem. Soc. 72, 1059–1062 who also used EPA ethyl esters to modify evening primrose oil which is a rich source of γ-linolenic acid. The process here too uses commercially available source of the acyl donor. Nutritional evaluation of the product was also not carried out.

Reference may also be made to Jensen, G. L., et al 1994 A.J.C.N., 60:518–524. wherin a structured lipid containing medium chain fatty acid residues and long chain fatty acid residues (n-3 fatty acids from fish oil) are absorbed faster by the body than the physical mixture of the same fatty acids. A description of the process for the production of the structured lipids is lacking and so are the physiological effects of the structured lipids beyond absorption.

Reference may be made to Lee, K-T and Akoh C. C, J. Food Biochem 23 (1999) 197–208. Wherein structured lipids were synthesized from synthetic tricaprylin and fish oil free fatty acids rich in n-3 PUFA. The product when fed to mice for 21 days showed lower levels of serum total cholesterol, LDL cholesterol and triacylglycerol in comparison with soybean oil. However it is not very clear from this study whether a physical mix (blending) of tricaprylin and fish oil having same fatty acid composition as the structured lipids would have the same effect as the structured lipids on the serum lipid profile. The soybean used as a control in this study does not provide a good comparison with the structured lipid, which had a different fatty acid composition.

U.S. Pat. No. 5,661,180 to DeMichele, et al., describes a structured lipid, which provides substantial benefits in terms of modifying the prostanoid synthesis pathway, resulting in an improved response to endotoxic shock and other stress states. This structured lipid includes three components formed on a glycerol backbone. The first component is either alpha-linolenic acid or dihomogamma-linolenic acid. The second component is a medium chain (C.6-C.12) fatty acid residue and the third component is a C.18-C.22 fatty acid residue. One of the lipids incorporated into the structured lipid is a marine oil. The draw back of this is that the fatty acids will be randomized among the triglycerides of the two oils selected and there will not be any specificity in the positioning of fatty acids in the structured lipids.

OBJECTS OF THE INVENTION

The main object of the present invention is to provide a process for the synthesis of unique structured lipids using useful fatty acids from natural sources.

Yet another object of the present invention is to provide a process for the synthesis of structured lipids that are rich in MCFA and omega 3 PUFA, which is nutritionally advantageous by way of being hypocholesterolemic and hypotriglyceridemic.

Still, another object of the present invention is to provide a process for the synthesis of structured lipids that could be clinically administered to patients in parenteral nutrition.

Further another object of the present invention is to provide a process of Enzymatic acidolysis to produce fats (structured lipids) with a better triglyceride-distribution than known natural fats.

Yet, another object of the present invention provides a process for structured lipids with an improved melting behavior, as they will hardly contain any trisaturated triglycerides.

Yet another object of the present invention is to provide a process to develop a product, for use in a controlled diet for critically ill patients, comprising lauric acid to provide quick energy and n-3 PUFA to modulate their eicosanoid production especially in immune compromised patients.

DETAILED DESCRIPTION OF THE INVENTION

Accordingly, the present invention provides for unique structured lipids obtained from interestifying coconut oil with free fatty acids obtained from hydrolysis of triglycerides of an animal source, said structured lipids contain up to 14% omega-3-poly unsaturated fatty acid and rich in medium chain fatty acid.

An embodiment of the present invention provides for the structured lipids comprising lauric acid that produces quick energy for critically ill patients.

Yet another embodiment of the present invention, wherein the structured lipids are hypocholesterolemic and hypotriglyceridemic.

Still yet another embodiment of the present invention, wherein said structured lipids having cholesterol lowering capacity in the range of 15–33%.

Another embodiment of the present invention, wherein said structured lipids are recovered by scaling up in the range of 85–90%.

Yet another embodiment of the present invention provides for the structured lipids comprising n-3 PUFA to modulate eicosanoid production in immune compromised patients.

Further another embodiment of the present invention, wherein the structured lipids having melting point ranging between 12–15° C. remain in liquid form without phase separation.

Yet another embodiment of the present invention, wherein the structured lipids are having a cod liver oil fatty acids and triglycerols of coconut oil for optimal nutrition.

Still another embodiment the present invention, wherein the structured lipids comprise n-3 PUFA levels from 0 in the unmodified coconut oil to 14% in the structured lipid.

Another embodiment of the present invention, wherein the serum and liver triglyceride level lowering capacity of the lipid in mammals is 32% and 20% respectively.

The present invention also provides for a process for the production of cholesterol lowering structured lipids from cod liver oil rich in omega 3 polyunsaturated fatty acids (omega 3 PUFA), said process comprising:
  (a) hydrolyzing triglycerides of said animal source by a known method, to obtain free fatty acids rich in omega 3 PUFA;
  (b) interesterifying coconut oil with the free fatty acids obtained from the step (a) at preferable molar ratio of 1:5;

(c) incubating with immobilized lipase at a temperature range of 37–55° C. for a period of 6–48 hours using a hydrocarbon solvent for enzymatic acidolysis thereby incorporating the required acyl groups into the specific positions of the triacylglycerols;

(d) separating the reaction products by adsorption chromatography using one or more organic solvents selected from ethers, hexane and optionally with 1 part of acetic acid to obtain structured lipids; and (e) recovering the structured lipids by scaling up in the range of 85–90%.

An embodiment of the present invention, wherein the triglycerides are selected from natural source namely coconut oil.

Another embodiment of the present invention, wherein the ethers are selected from group comprising petroleum ether, diethyl ether.

Yet another embodiment of the present invention, wherein the ratio of ethers: hexane used in the range of 100:0 to 5:95.

Still another embodiment of the present invention, wherein the free fatty acids are derived from an animal source namely cod liver oil.

Yet another embodiment of the present invention, wherein the hydrocarbon solvent is selected from petroleum ether, dioxane, isooctane, n-hexane and toluene.

Another embodiment of the present invention, wherein the incubation is carried out using an immobilized lipase enzyme at 5 to 10% (w/w) of the substrates.

Yet another embodiment of the present invention, wherein the immobilized lipase is obtained from *Rhizomucor meihei*.

Still another embodiment of the present invention, wherein the immobilized lipase obtained from *Rhizomucor meihei* can be used up to 25 process cycles without loss of activity, thus ensuring economic viability

BRIEF DESCRIPTION OF THE ACCOMPANIED DIAGRAMS

Figure 1:
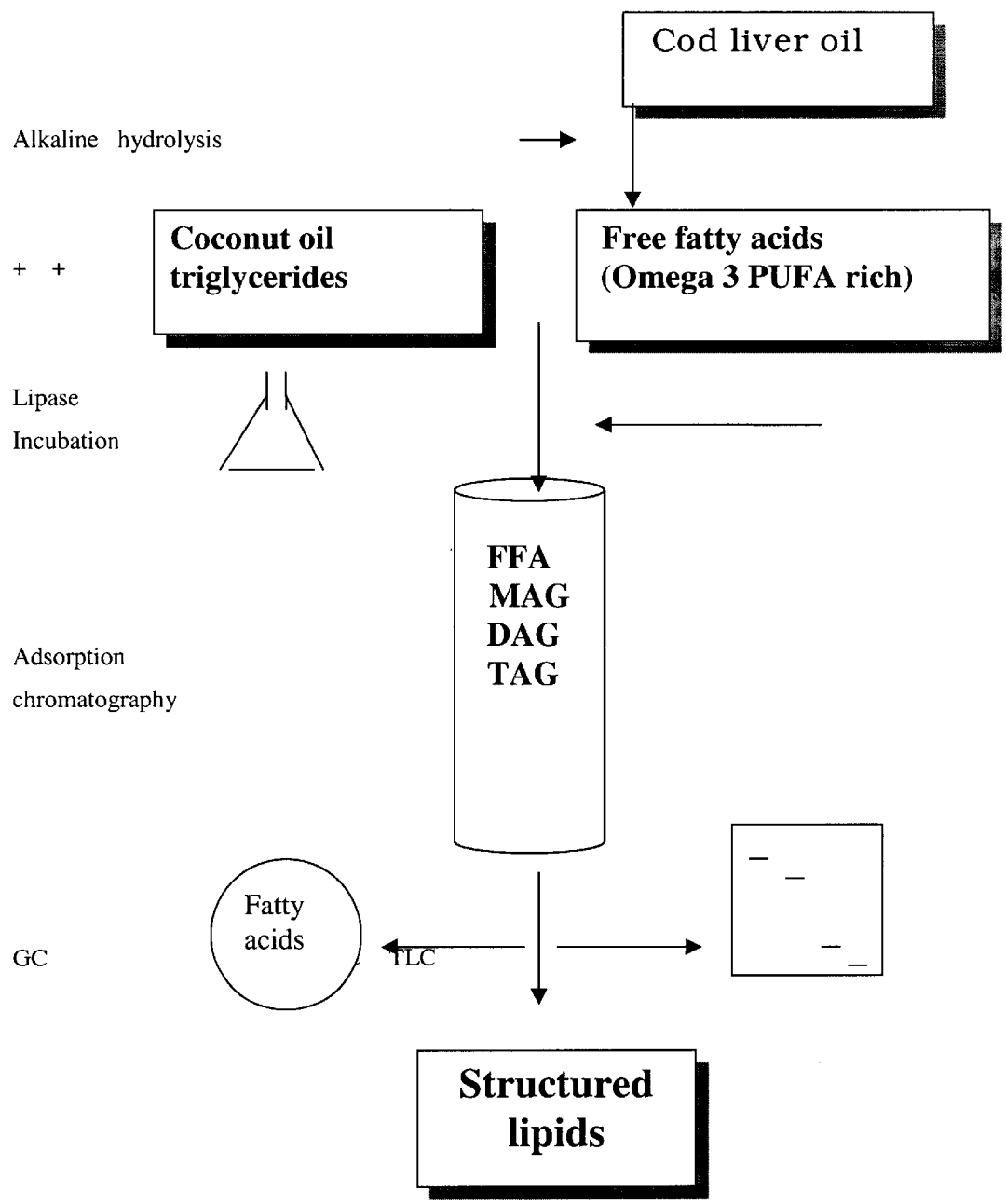
FIG. 1 is a pictorial representation of the steps involved in the synthesis of structured lipids.
Figure 2:
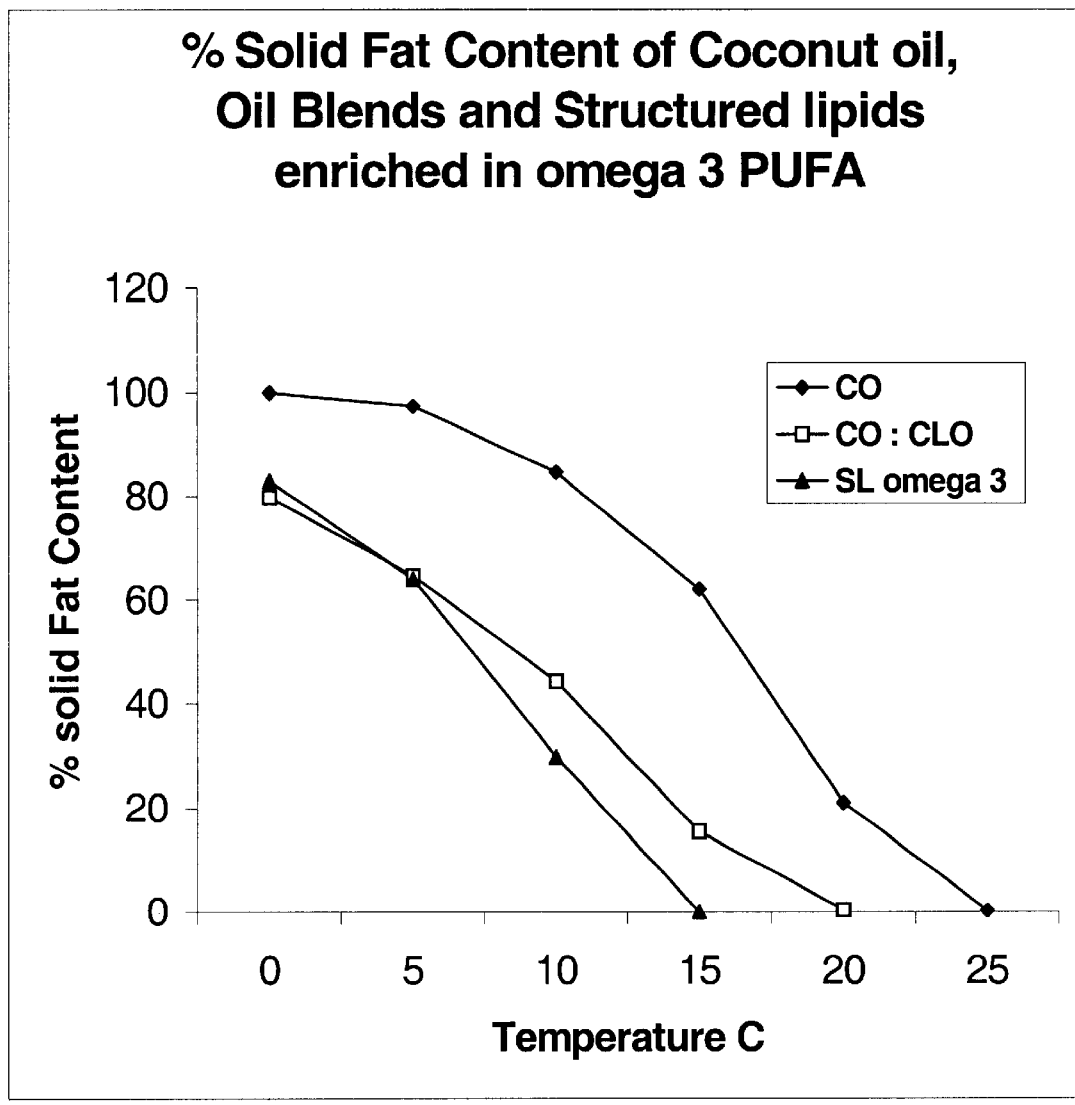
FIG. 2 is a Graphical Diagram depicting the lower melting point of the Structured lipids enriched in Omega 3 PUFA.

The following examples are given by way of illustration of the present invention and therefore should not be construed to limit the scope of the present invention.

EXAMPLE 1

Reaction conditions were optimized for the production of structured lipids from coconut oil with cod liver oil free fatty acids employing a statistical design (Response surface methodology). Under optimized conditions as predicted by the model for maximum incorporation, 100 mg of coconut oil and 249 mg of cod liver oil free fatty acids were taken and 0.5 ml of hexane was added. The reaction mixture was taken in a 25-ml conical flask. 17.5 mg of immobilized lipase from *Rhizomucor meihei* was used and the incubation was carried out in an orbitally shaking waterbath at 160 rpm at 54° C. for 34 hours. 13.65% of n-3 fatty acids was incorporated into coconut oil. The modified triglycerides (structured lipids) was separated by preparative thin layer chromatography with petroleum ether: ethyl ether: acetic acid (80:20:1 v/v/v) as the developing solvent. The analysis of fatty acids by gas chromatography showed an increase in n-3 PUFA levels from 0 in the unmodified coconut oil to 14% in the structured lipid. The recovery of triglycerides was 90.7 mg.

The results thus obtained, are recorded in the Table 1

TABLE 1

Fatty Acid Composition (wt. %) of Unmodified Coconut Oil and Free Fatty Acids Obtained from Cod Liver Oil and Structured Lipid.

| Fatty Acids | Coconut Oil | Cod Liver Oil Free Fatty Acids | Structured lipids |
|---|---|---|---|
| Caprylic (8:0) | 2 | — | — |
| Capric (10:0) | 3 | — | — |
| Lauric (12:0) | 48 | — | 16 |
| Myristic (14:0) | 24 | 5 | 11 |
| Palmitic (16:0) | 9 | 12 | 12 |
| Palmitoleic (16:1) | — | 11 | 3 |
| Stearic (18:0) | 3 | 3 | 4 |
| Oleic (18:1) | 9 | 24 | 25 |
| Linoleic (18:2) n-6 | 2 | 5 | 5 |
| Linoleic (18.3) | — | 1 | — |
| 20:1 | — | 10 | 6 |
| Arachidonic (20:4) | — | 6 | 3 |
| Eicosapentaenoic (20:5) n-3 | — | 13 | 10 |
| Docosatetranoic (22:4) | — | 1 | — |
| Docosapentanoic (22:5) | — | 1 | — |
| Docosahexaenoic (22:6) n-3 | — | 8 | 4 |

EXAMPLE 2

Enzymatic acidolysis reactions were carried out at laboratory scale batch reactions of 100 g triglycerides and 249 g of free fatty acids from cod liver oil taken in 2-liter Erlenmeyer flasks, which served as the bioreactor. 17.5 g of immobilized lipase from *Rhizomucor miehei* was used and the reaction was carried out in 500 ml of hexane. Incubation was carried out for 34 hours at 54° C. in an orbitally shaking waterbath.

Triglycerides were separated from the reaction mixture by column chromatography. A mixture of 20 g each of alumina and silica gel (100–200 mesh size) were activated at 200° C. for 2 hrs and cooled in a desiccator. Slurry of this was made in hexane and packed in 4 cm×35 cm glass columns.

30 g of the sample from the reaction mixture were loaded on the column and eluted with 350 ml of hexane: diethyl ether (95:5 v/v). The fractions containing triglycerides were pooled and solvent was removed in a vacuum rotary evaporator. The purity of triglycerides was checked by thin layer chromatography. Recovery of the scaled up product was 87 g.

EXAMPLE 3

The structured lipids were fed to rats in the diet as the sole source of fat at 10% levels for a period of 60 days. The serum and liver cholesterol decreased by 15 and 33% respectively and the triglyceride levels decreased by 32 and 20% respectively in the serum and liver.

The data thus obtained is recorded in the following Table 2.

TABLE 2

Lipid Profile of Rats fed on Coconut oil, Blends and Structured lipids

| Dietary Groups | Total Cholesterol | | Triglycerides | |
|---|---|---|---|---|
| | Serum mg/dl | Liver Mg/g | Serum mg/dl | Liver Mg/g |
| Coconut oil | 74.54 ± 1.3 | 7.21 ± 0.2 | 169.90 ± 6.9 | 12.8 ± 2.2 |
| Coconut oil: Cod liver oil (1:1) Blend | 71.38 ± 2.6 | 7.78 ± 1.8 | 126.6 ± 4.0 | 9.86 ± 0.3 |
| Structured lipid Omega 3 PUFA rich | 62.96 ± 2.0 | 4.77 ± 0.9 | 115.2 ± 5.0 | 7.15 ± 0.9 |

EXAMPLE 4

The structured lipids were subjected to DSC studies wherein their peak melting temperature and solid fat content was determined. The peak melting temperature of structured lipids enriched in omega 3 fatty acids was 12.2° C. while that of coconut oil was 20.8° C.

EXAMPLE 5

As a consequence, the combination of fish oil fatty acids and medium-chain fatty acids to form structured lipids will give optimal nutrition. According to published reports, rats receiving structured lipids containing both medium chain and Long chain fatty acids showed high gain in body weight, enhanced skeletal muscle, and liver protein synthesis, as well as markedly increased nitrogen retention and serum albumin concentrations compared to groups fed long chain triglycerides (LCT), MCT or a physical mix of LCT and MCT.

ADVANTAGES (1) The present invention uses fatty acids from natural sources to create novel structured lipids with potential impacts on nutrition and health
(2) The process could be employed for the modification of coconut oil, which is deficient in EFA by effectively incorporating omega 3 fatty acids.
(3) The production could be scaled up without loosing the efficacy of the process.
(4) The use of natural sources of triglycerides and fatty acids for the acidolysis reaction and the use of immobilized lipase which could be reused up to 25 cycles without loss of activity ensures that the process is economically viable.
(5) Nutritionally the structured lipid proved to be more advantageous than oil blends with similar fatty acid composition or unmodified coconut oil in being hypocholesterolemic and hypotriglyceridemic.
(6) The structured lipid, rich in MCFA and omega 3 PUFA, will provide a lipid source, primarily for use in a controlled diet for critically ill patients, which has lauric acid to provide quick energy and the changes in eicosanoid synthesis seen with omega 3 PUFA feeding will improve immunocompetence and a reduced inflammatory response to injury. Patients in need of elemental diets will benefit from having their immunocompetence improved.
(7) The structured lipid obtained as a result of enzymatic acidolysis reactions displayed an improved melting behavior compared to coconut oil or the oil blends. The structured lipid has a lower melting temperature than unmodified coconut oil thus maintaining them in the liquid state even at low temperatures. Hence the structured lipid at a temperature of 12–15° C. remains a liquid without phase separation.
(8) The structured lipids of the present invention having a high cholesterol lowering capacity as well as triglyceride levels in the body when compared to the blend of physical mixtures of two oils, having similar acid composition.

What is claimed is:

1. A process for production of cholesterol lowering structured lipids from cod liver oil rich in omega 3 polyunsaturated fatty acids (omega 3 PUFA), said process comprising:
   (a) hydrolyzing triglycerides of said animal source by a known method, to obtain free fatty acids rich in omega 3 PUFA;
   (b) interesterifying coconut oil with the free fatty acids obtained from the step (a) at preferable molar ratio of 1:5;
   (c) incubating with immobilized lipase at a temperature range of 37–55° C. for a period of 6–48 hours using a hydrocarbon solvent for enzymatic acidolysis thereby incorporating the required acyl groups into the specific positions of the triacylglycerols;
   (d) separating the reaction products by adsorption chromatography using one or more organic solvents selected from ethers, hexane and optionally with 1 part of acetic acid to obtain structured lipids; and
   (e) recovering the structured lipids by scaling up in the range of 85–90%.

2. A process as claimed in claim 1, wherein the triglycerides are selected from natural source namely coconut oil.

3. A process as claimed in claim 1, wherein the ethers are selected from group comprising petroleum ether, diethyl ether.

4. A process as claimed in claim 1 wherein, the ratio of ethers: hexane used in the range of 100:0 to 5:95.

5. A process as claimed in claim 1, wherein the free fatty acids are derived from an animal source namely cod liver oil.

6. A process as claimed in claim 1, wherein the hydrocarbon solvent is selected from petroleum ether, dioxane, isooctane, n-hexane and toluene.

7. A process as claimed in claim 1 wherein the incubation is carried out using an immobilized lipase enzyme at 5 to 10% (w/w) of the substrates.

8. A process as claimed in claim 1, wherein the immobilized lipase is obtained from *Rhizomucor meihei*.

9. A process as claimed in claim 1, wherein the immobilized lipase obtained from *Rhizomucor meihei* can be used up to 25 process cycles without loss of activity, thus ensuring economic viability.

10. Unique structured lipids obtained from interestifying coconut oil with free fatty acids obtained from hydrolysis of triglycerides of an animal source, said structured lipids contain up to 14 mol % omega-3-poly unsaturated fatty acid and rich in medium chain fatty acid.

11. Unique structured lipids as claimed in claim 10, wherein the structured lipids comprise lauric acid that produces quick energy for critically ill patients.

12. Unique structured lipids as claimed in claim 10, wherein said structured lipids are hypocholesterolemic and hypotriglyceridemic.

13. Unique structured lipids as claimed in claim 10, wherein said structured lipids having cholesterol lowering capacity in the range of 15–33%.

14. Unique structured lipids as claimed in claim 10, wherein said structured lipids are recovered by scaling up in the range of 85–90%.

15. Unique structured lipids as claimed in claim 10, wherein the structured lipids comprise n-3 PUFA to modulate eicosanoid production in immune compromised patients.

16. Unique structured lipid as claimed in claim 10, wherein the structured lipids having melting point ranging between 12–15° C. remain in liquid form without phase separation.

17. Unique structured lipids as claimed in claim 10, wherein the structured lipids are having a cod liver oil fatty acids and triglycerols of coconut oil for optimal nutrition.

18. Unique structured lipid as claimed in claim 10, wherein the structured lipids comprise n-3 PUFA levels from 0 in the unmodified coconut oil to 14% in the structured lipid.

19. Unique structured lipid as claimed in claim 10, wherein the serum and liver triglyceride level lowering capacity of the lipid in mammals is 32% and 20% respectively.

* * * * *